E. F. MAASKE.
DETACHABLE BREAD TIN HANDLE.
APPLICATION FILED MAY 10, 1916.
1,227,920.
Patented May 29, 1917.
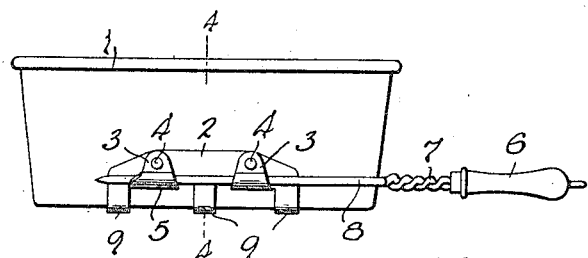
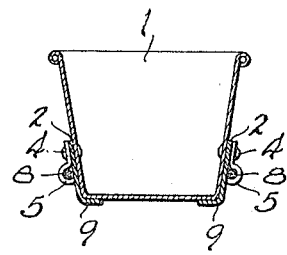
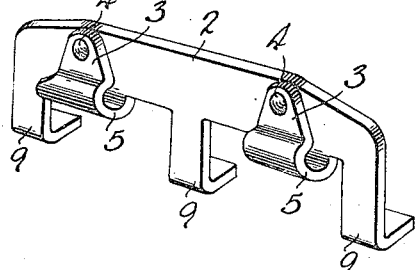
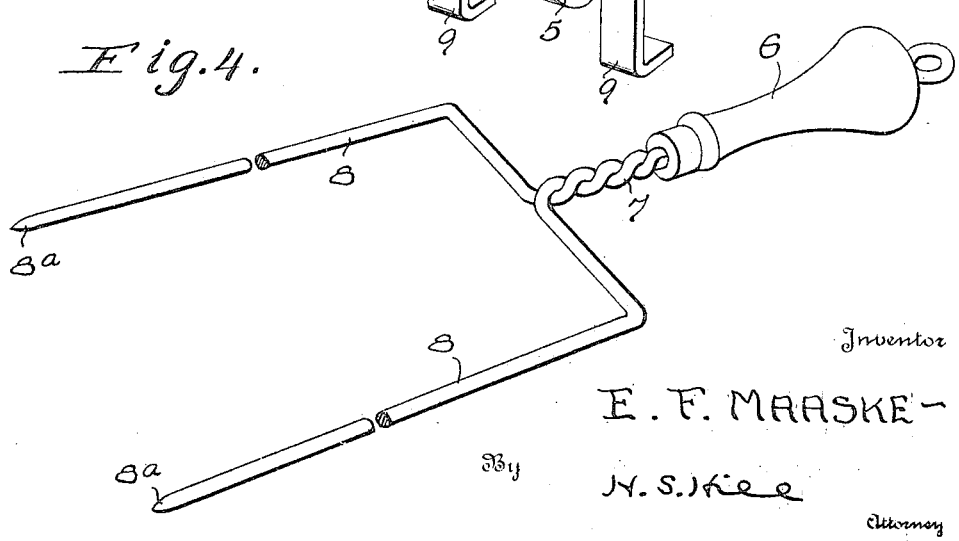
Inventor
E. F. MAASKE
By
N. S. Kee
Attorney

UNITED STATES PATENT OFFICE.

EMIL F. MAASKE, OF ABLEMAN, WISCONSIN.

DETACHABLE BREAD-TIN HANDLE.

1,227,920.          Specification of Letters Patent.          Patented May 29, 1917.

Application filed May 10, 1916.   Serial No. 96,589.

*To all whom it may concern:*

Be it known that I, EMIL F. MAASKE, a citizen of the United States, residing at Ableman, in the county of Sauk, State of Wisconsin, have invented a new and useful Detachable Bread-Tin Handle; and I do hereby declare the following to be a full, clear, and exact description of the invention, such as will enable others skilled in the art to which it appertains to make and use the same.

The present invention relates to a detachable handle for bread tins, and has for its object to provide a device of this character which embodies novel features of construction whereby the bread tin can be removed from the oven and turned over to eject the bread without danger of burning the fingers.

Further objects of the invention are to provide a device of this character which is comparatively simple and inexpensive in its construction, which can be used in connection with the ordinary type of bread tin, which does not prevent the tins from being packed closely together in the oven, and which serves to reinforce and protect the bread tin so that the life thereof is prolonged.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a conventional bread tin, showing a detachable handle constructed in accordance with the invention applied thereto.

Fig. 2 is a transverse sectional view through the same taken on the line 4—4 of Fig. 1.

Fig. 3 is a detail perspective view of the handle receiving plate which is applied to the sides of the bread tin.

Fig. 4 is a detail perspective view of the detachable handle.

Corresponding and like parts are referred to in the following description and indicated in all the views of the drawings by the same reference characters.

Referring to the drawings, which illustrate one embodiment of the invention, the numeral 1 designates a bread tin or pan which is of the conventional construction, being rectangular in shape and flared upwardly toward the top thereof. Elongated plates 2 are fitted against the opposite sides of the pan 1 at points toward the bottom thereof, the upper edge of each of the elongated plates being preferably curved or rounded, as indicated, while a pair of tongues 3 project from the lower edge thereof. These tongues 3 are returned upwardly so that the end portions thereof fit against the plate 2, said end portions of the tongues being engaged by the same rivets 4 which are employed for securing the plate to the tin. The base of each of the tongues 3, or that portion of the tongue adjacent to the lower edge of the plate 2, is rolled outwardly to provide a longitudinally extending side channel 5, the said channels 5 on each side of the tin or pan 1 being in alinement with each other.

The detachable handle includes a hand hold 6 from which a stem 7 extends, the end of the stem being bifurcated to provide a pair of spaced and substantially parallel arms 8 adapted to straddle the base of the tin 1 and enter the side channels 5 provided by the tongues 3 of the plates 2. The extremities of the arms 8 are pointed, as indicated at $8^a$, so that they can be inserted in the channels 5 without difficulty, and when the said arms are in position within the side channels, the tin 1 can be easily lifted, removed from the oven, and manipulated in any desired manner, without danger of burning the fingers. The flared sides of the tin 1 completely overhang the side channels 5, so that the bread tins 1 can be packed closely together on the inside of the oven, the detachable handle being only used for removing the hot tins from the oven and manipulating the same while they are too hot to be handled with the hands. The arms 8 may be conveniently formed of stiff wire, the inner ends of which are brought together and twisted to form the stem 7 which is secured in the end of the wooden hand hold 6 in the usual manner.

The lower edge of each of the elongated plates 2 is provided with extensions or ears 9 arranged alternately with respect to the tongues 3 and bent under the bottom of the tin 1 at the edges thereof. These extensions 9 thus serve to relieve the wear upon the bottom of the tin, and the tin is protected by the elongated plates 2 in such a manner that the life thereof is very materially prolonged.

If desired, the arms 8 of the detachable handle may be sprung outwardly so that the inner ends thereof converge toward each other and so that the distance between the pointed outer end thereof is somewhat greater than the distance between the centers of the handle receiving rolls 5, the said construction causing the arms to normally spring outwardly against the outer walls of the rolls 5 when they are inserted therein. The frictional engagement caused by this spring action of the arms 8 will tend to prevent the accidental displacement of the handle from the tin.

Having thus described the invention what I claim as new and desire to secure by Letters Patent, is:—

1. In a device of the character described, the combination with a pan and a detachable handle member having a bifurcated end, of a plate applied to each side of the pan and provided at the lower edge thereof with alternately arranged tongues and extensions, the extensions being carried under the bottom of the pan, while the tongues are rolled outwardly to provide longitudinally extending side channels, said channels being adapted to loosely receive the arms of the bifurcated handle member.

2. In a device of the character described, the combination with a pan and a detachable handle member having a bifurcated end, of a plate applied to each side of the pan and provided at the lower edge thereof with alternately arranged tongues and extensions, the extensions being carried under the bottom of the pan, while the tongues are returned upwardly so that the ends thereof fit against the plates, the bases of the tongues being rolled outwardly to provide longitudinally extending side channels, and fastening members extending through the plates and returned tongues and serving to secure the plates to the pan, said side channels being adapted to loosely receive the arms of the bifurcated handle member.

In testimony whereof I have signed my name to this specification in the presence of two subscribing witnesses.

EMIL F. MAASKE.

Witnesses:
R. M. PIERCE,
FRANK B. MOSS.